8191x
R. Daniels.
Shearing Mach.
Patented May 13, 1834
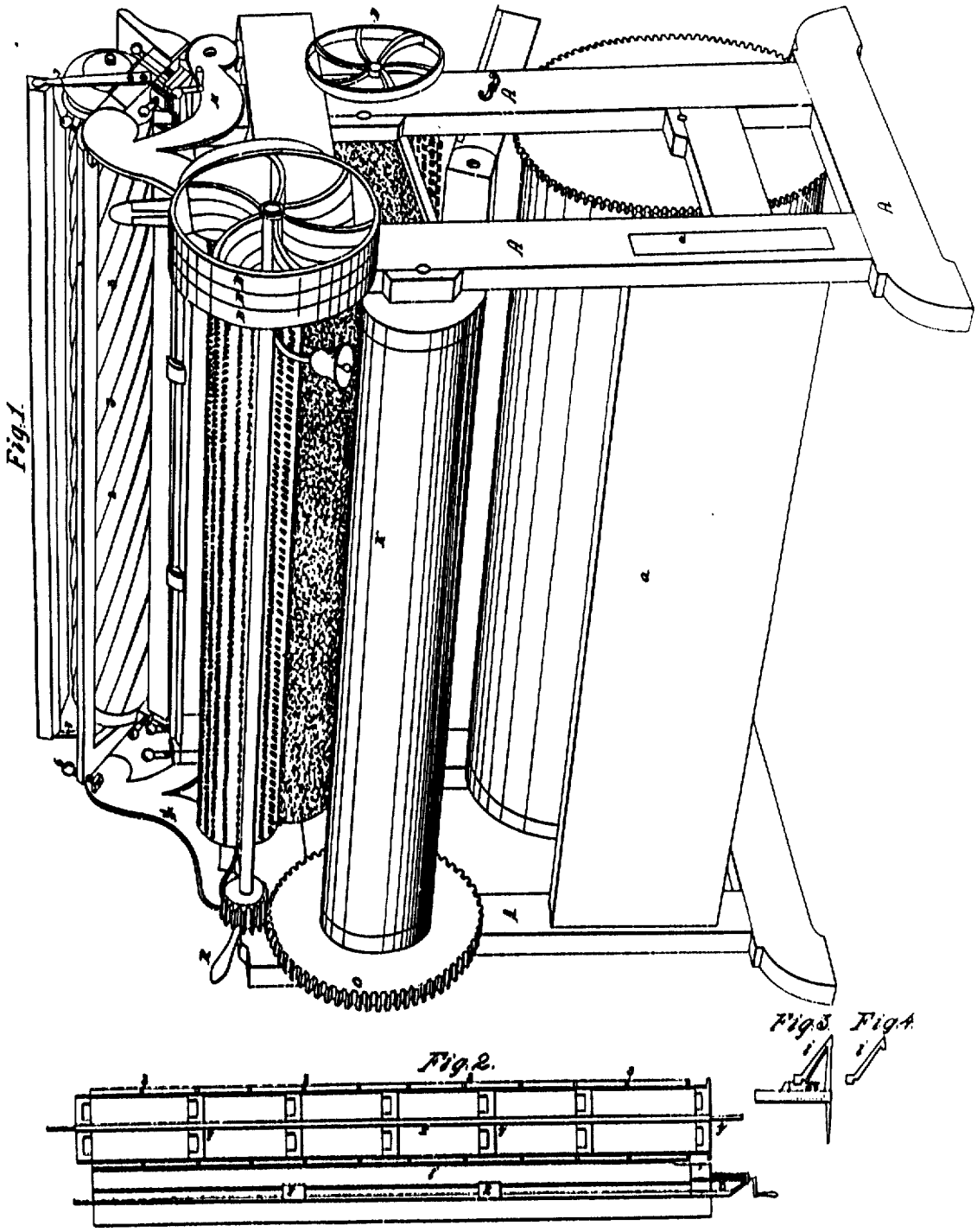

8191x
Sheet 2. 3 Sheets.
R. Daniels.
Shearing Mach.
Patented May 13, 1834.
No 1
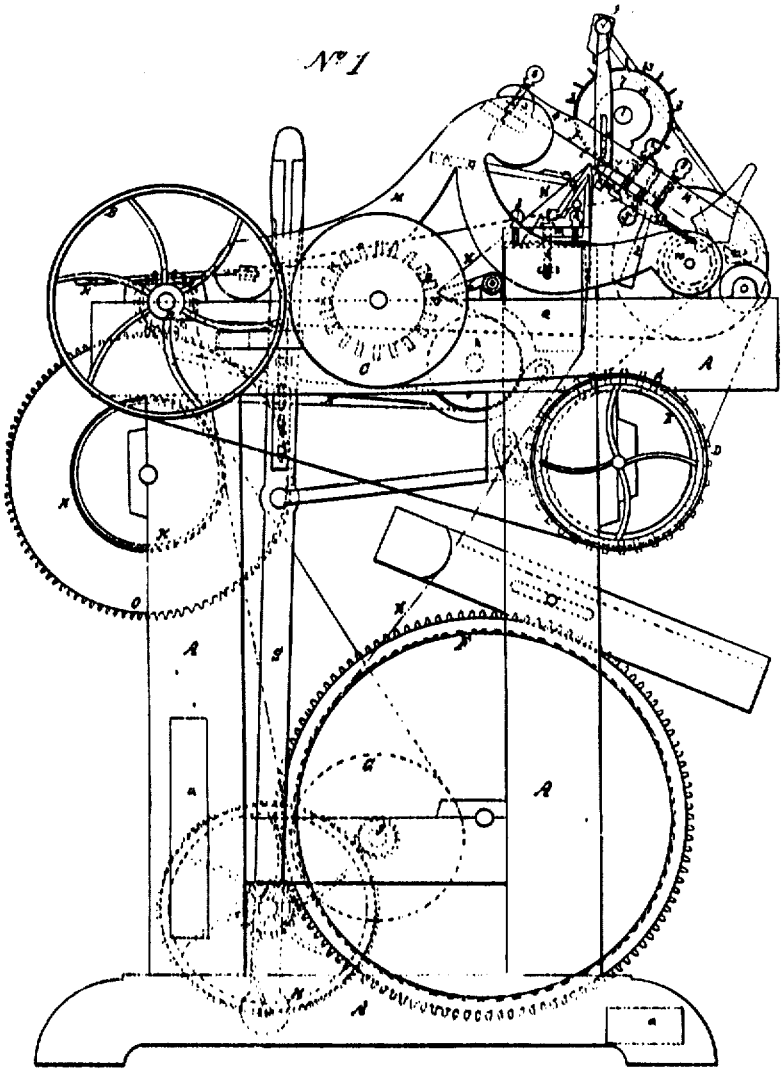

CLASSIFICATION
8191X
DIVISION.
SHEET 3 of 3
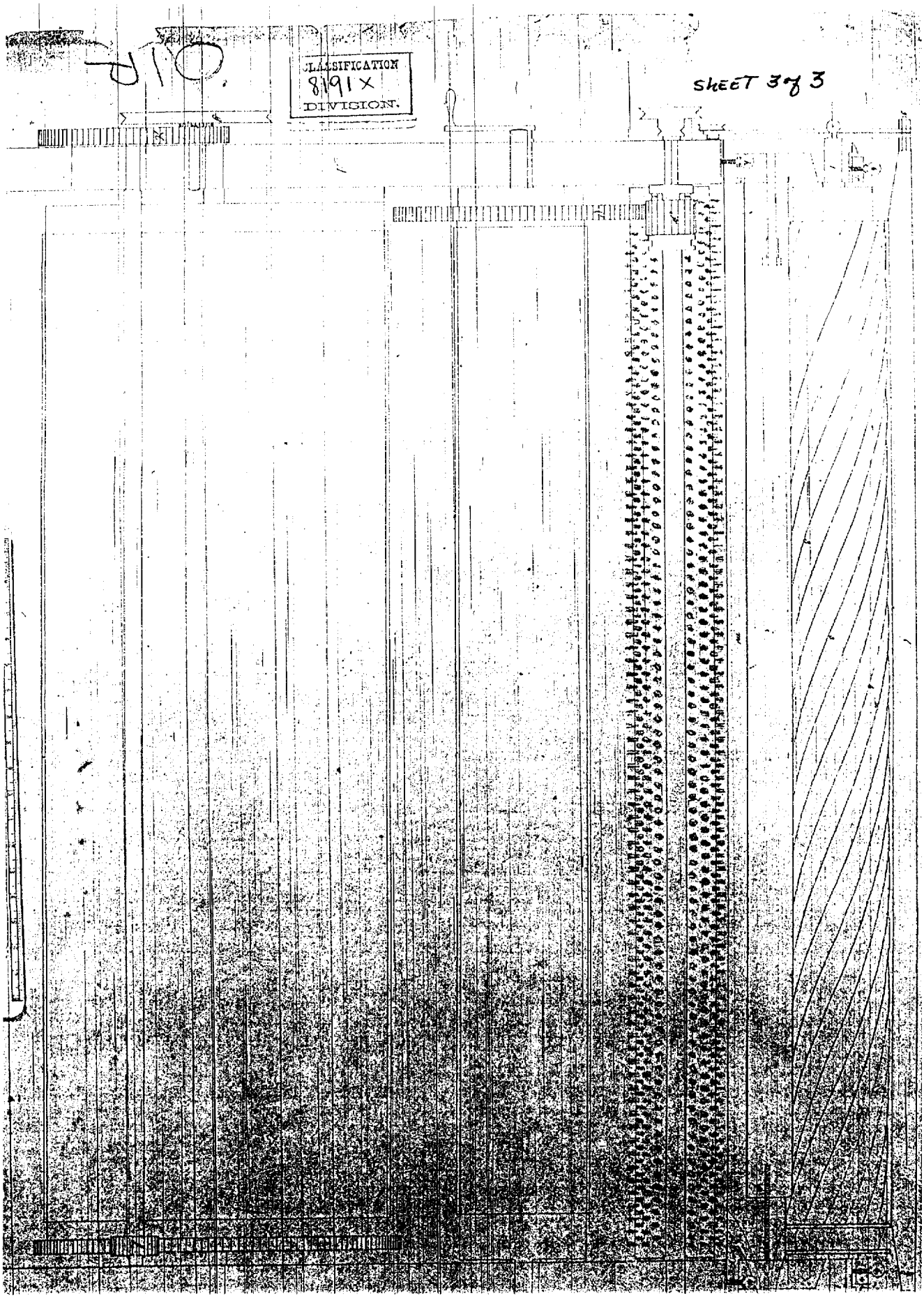

5/13/1834 8191X

May 13, 1834

Reuben Daniels
Letters Patent

The Schedule referred to in these Letters Patent and making part of the same containing a description in the words of the said Reuben Daniels himself of his improvement "in Shearing Machines for Shearing woolen cloth" for which Letters Patent were granted dated the 13th day of May 1834 which Letters Patent being hereby cancelled on account of a defective specification. To all to whom these presents shall come.
Be it known that I Reuben Daniels of Woodstock in the County of Windsor and State of Vermont Machinist, have invented made and applied to use a new and useful improvement in Shearing Machines for Shearing woollen & other cloths an imperfect description & specification whereof has been heretofore given, a copy whereof is annexed to letters patent heretofore granted to me bearing date the thirteenth day of May in the year of our Lord one thousand eight hundred and thirty four and now surrendered as inoperative and which invention & improvement I do hereby accurately & perfectly describe. For the better understanding of my said invention & improvement drawings of a Machine wherein my said improvement is made and & applied are hereunto annexed numbered 1, 2, 3. as part of this specification. Drawing numbered one, is an end view shewing both ends of the machine. Drawing numbered two is a perspective view of the machine. Drawing numbered three is a front view of the machine. In Drawing No 1 Fig. 1 represents the bearings on which the revolving cylindrical cutter turns. Fig. 2. is the cast iron support to which the ledger blade is rivet ed or fastened. Fig's 3, 3, 3, 3, &c represent the spiral cut- ting

5/13/1834 8191X ting blades attached to the revolving cylinder Fig. 4.4. repre
sent the cast iron frame to which the revolving cylindrical
cutter & ledger blade are attached Figs 5.5.5. &c. are screws
to elevate or depress the ledger blade so as to bring it to its
proper position in relation to the revolving spiral cutting
blades. Fig. 6. represents screws to depress or elevate the
iron frame 4.4. so as to regulate the closeness of shearing the
nap of the cloth. Fig. 7. represents stands to support the
gudgeons of the roller. Fig. 9. represents the bearings of the
roller. Fig. 10. represents pivots on which the iron frame
which supports the rotary cutter and ledger blade turns.
A. A. A. A. A. represent the frame of the machine.
B. represents the driving pullies on the main shaft.
C. represents the pulley on the brush for raising the nap.
D. represents the pulley on the brush for laying the nap.
E. represents the pulley which drives the revolving cylin
drical cutter. F. represents the gear on the cloth drum
on the right hand end. G. is a cone pulley connected
with the small gear. [illegible] at the left hand end to reg
ulate the feed of the cloth through the machine. H. is
a gear wheel at the left hand and on the [illegible] which
meshes into the small gear g. I. is a shipper to throw the
gear g out of the gear H. and also to throw the friction
lever off from the friction roller K. also to throw the cloth
off from the brush for laying the nap while the cloth is run
ning back. K. is a cloth roller from which the cloth
is drawn off in the process of shearing. L. is a rest to
bear the cloth against the brush for raising the nap.
M. is a scroll made of cast iron attached to the upper
part of the frame A. A. A. A. — N. N. N. N. N. shew
the course of the cloth in passing the shears. O is a gear
wheel on the cloth roll at the end on the left hand
meshing into the gear wheel ~~above~~. (P) to roll the cloth
back

5/13/1834 8191X back after it has passed the shears. This operation is per-
formed by moving the gear P. by means of the lever R.
placed in a groove running around the gear P. at the
left hand end which gear P. runs loose on the driving
shaft while the cloth is in the process of shearing, after
the whole web has passed the shears, the bell gives an
alarm and the attendant moves the lever R. from right
to left and the gear P. connects with the stationary dog
on the driving shaft, and the motion of the cloth is re-
versed and the cloth again wound around the roll in
readiness to be sheared a second time. During the process
of shearing) the motion of the cloth in passing the shears
turns the cloth roll and the gear O being meshed into
the gear P. the latter gear P. turns like a loose pulley
on the driving shaft. a. a. a. are ends of girts that
go lengthwise of the frame. C. is the brush for raising
the nap. d. is the brush for laying the nap. h. h. h.
are screws to adjust the rests M. & i. k is a roll to
tighten the cloth. l. is a flanch on the roll ll. to re-
ceive the screw 6. In drawings numbered 2 & 3. the same
letters & figures represent the same parts as in drawing
numbered one. In drawing No 3 n. n. n. is a sup-
port to receive the screw O. which passing through the nut
p. and being turned by the crank r moves the
slide rest i. back and forward, on the other rest M.
The several drawings No 1 & 3 and Fig 1 in No 2. are
upon a scale of three inches to a foot. The machines rep-
resented in the drawings are adapted for shearing cloth
from end to end but the form, construction, propor-
tions and materials thereof may be some what varied
at the discretion of the machinist and the construction
and form of machines adapted for shearing from list
to list will of course be somewhat different, but con-
formable formable to those now in use for that purpose except as necessarily varied or altered by my said improvement, but it is not intended particularly or minutely to describe all or any of the machines in which my said improvement is made or may be used or to which it may be applied, further than to shew in what and wherein my said improvement consists and the use and application thereof. That part of my improvement herein after described which consists in the sliding rest for saving the listing or selvage is of course not to be used in the machines for shearing from list to list. One part of my said improvement consists in the construction & use of the peculiarly constructed rotary cylindrical cutter herein described which is constructed as follows. The axis is a metallic bar of cast steel or other metal about one inch in diameter of sufficient hardness for bearings and of a length proportional to the length of the shears or rotary cutter proposed to be made. It is represented by y. in Fig. No 2. in drawing No 2. Solid metallic wheels or heads of the diameter of the inside of the cylinder to be formed are to be prepared with holes in the centres through which the metallic bar aforesaid is to be passed. which holes are to be made so as closely to fit to the bar and which wheels are soldered or fastened in their proper places to the said bar, and said wheels or heads should be about one fourth of an inch in thickness and should have naves or hubs at the centre of sufficient strength to support them, and at the periphery should have flanches about one fourth of an inch thick and about three fourths of an inch broad. These wheels may be of brass or other metal but brass is deemed best. They are represented by y. y. &c in Fig 2. in drawing No 2. Spiders with arms may be used instead of these solid wheels, but the solid wheels wheels are preferred on account of their superior firmness
and stiffness in proportion to their weight. The number
of these metallic heads. wheels or spiders ought to be
such as that they may be about ten or twelve inches
apart from each other and of course must be more or
less according to the length of the cylinder to be formed.
The number however may be somewhat varied at
discretion having regard to the firmness of the cylinder
to be formed. One of these heads, wheels or spiders is to
be placed at each end of the cylinder and where the
metallic sheets herein after mentioned are united to form
the periphery of the cylinder, one of these heads, wheels or
spiders should be put at each place where the sheets are
united. On these heads, wheels or spiders a periphery
made from sheets of tin copper or other suitable metal
bent & made into the form of a cylinder, with edges lap-
ping over each other firmly, soldered or fastened togeth-
er, so that the inner surface may conform exactly to
the periphery of said heads wheels, or to the rims of the
spiders, is to be soldered or fastened firmly. Small
strips of tin or other suitable metallic plate of about one half
an inch in width having one of their edges bent up at
right angles to the extent of about one eighth of an inch,
are to be firmly soldered or fastened by the widest part
around the periphery of the cylinder thus formed, spi-
rally like the blades of the rotary cutter now in use
The number of these strips is to be equal to the num-
ber of the cutting blades to be used, which may be
from ten to twenty according to the diameter of the cyl-
inder. The diameter of the cylinder may be from three
to five inches or more. The back or iron side of the cutting
blades are to be soldered to the outside of the lips or upright
edges of the strips of tin or other metal soldered or fas-
tened

5113/1834 , 8191X tened to the cylinder as aforesaid, and the bottom or lower part of the front or steel side is to be soldered to the cylinder, a small body of solder being left in front to brace the blade of the cutter. Rotary cylindrical cutters constructed in this manner may be used for all purposes of shearing cloth for which the rotary cutter now in use is used. The cutting blades are similar to those now in the rotary cutter commonly used. another part of my improvement and which is used only in shearing cloth from end to end consists in a double metallic rest or support, the upper part whereof is moveable in the place of the metallic support or rest now commonly used under & near the ledger blade to hold the cloth firmly in contact with the rotary cutter & ledger blade during the process of shearing) The under part of the metallic support or rest is made nearly like that now in use, excepting pieces of iron or other metal screwed on to keep the moveable rest in its proper place marked Z.Z. in Fig. 2. of Drawing No 2. Above this is a moveable rest of cast iron brass or other suitable metal marked, i. on said last mentioned figure adapted and fitted to the rest or support beneath so that by turning a screw marked O. in the last named figure or by a lever or gearing the sliding rest may be made to move or slide upon the rest or support beneath it backwards or forwards so as to be accommodated to the width of the cloth in such manner as to permit the listing or selvage at one end of the rest to drop down from under the blades of the rotary cutter without being sheared, at the other end the listing or selvage is preserved by being allowed to pass beyond the blades of the rotary cutter. The moveable rest may be made capable of being moved so as to save the listing of cloths varying in width by moving ing the sliding rest from right to left & left to right as occasion may require. The form of the moveable rest is also shown by an end view in figures 3&4 in Drawing numbered two. In the construction of the rotary cutter instead of a metallic sheet or sheets, a hollow cylinder may be cast from brass or other suitable metal & such strips of tin or other metal may be soldered thereon as aforesaid, and the blades may be soldered thereto as aforesaid but the metallic plate or plates is deemed preferable.

The sliding rest laps over the under rest at the top as represented in Figs 3&4 in Drawing No 2. so as to present an uniform surface for the cloth straight & even. Although I have described the machinery and apparatus of the whole of a shearing machine, yet it is to be understood that what I claim and all which I claim as new & as my invention & improvement is the construction of the rotary cutter with heads wheels or spiders and a metallic sheet or sheets as aforesaid, or of cast metal ~~[illegible]~~ as aforesaid, with the blades soldered thereto as aforesaid, and the use of rotary cutters so constructed & made in machines for the purpose of shearing woolen and other cloths either from end to end or from list to list; and the construction & use of the sliding rest aforesaid, lapping over as aforesaid, in the machines for shearing cloth from end to end for the purpose of saving the listing or selvages. In witness that the above is a true specification of my said invention & improvement I have hereto set my hand this twenty ninth day of July eighteen hundred and thirty-four Witnesses
[illegible] Rand
Francis Gardner Jr Reuben Daniels
Spec. 270 [illegible]

Drawing

[illegible]